Nov. 12, 1963   W. T. LIVERMORE   3,110,266
HYDRAULIC PUMP AND CONTROL VALVE ASSEMBLY
Original Filed Feb. 24, 1955   4 Sheets-Sheet 2

INVENTOR.
WILLIAM T. LIVERMORE
BY
*Farley Forster & Farley*
ATTORNEYS

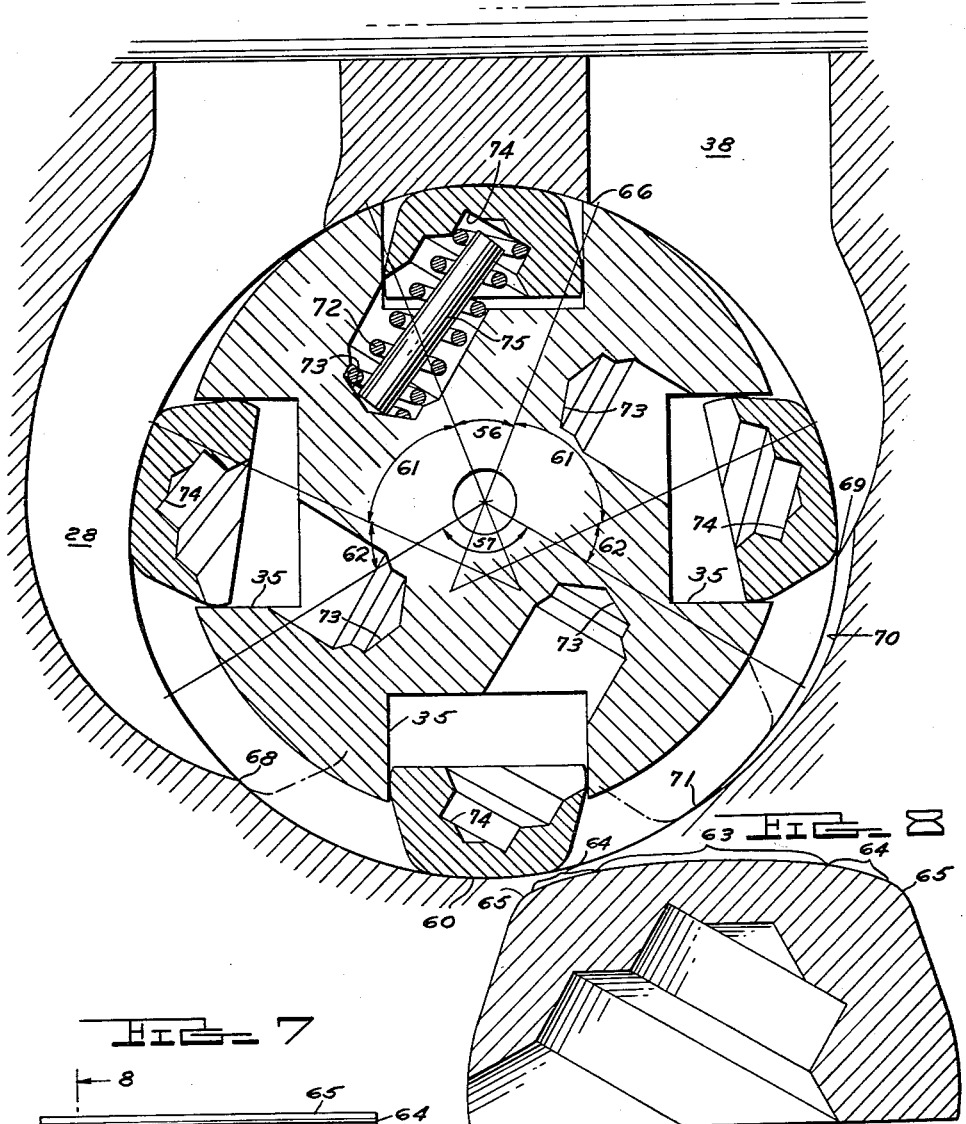

Nov. 12, 1963     W. T. LIVERMORE     3,110,266
HYDRAULIC PUMP AND CONTROL VALVE ASSEMBLY
Original Filed Feb. 24, 1955     4 Sheets-Sheet 4
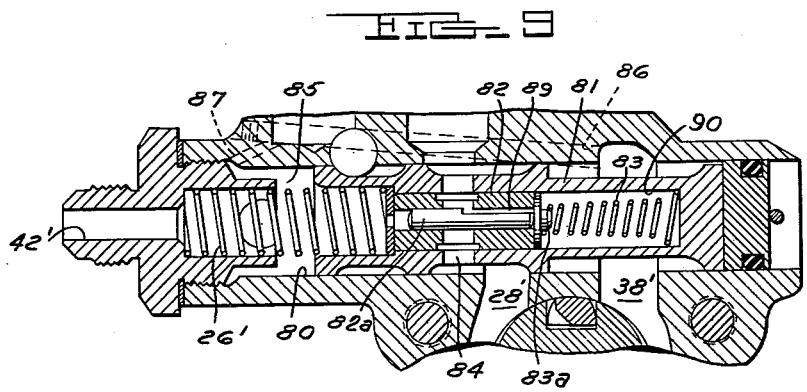
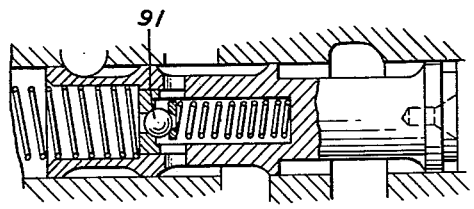
INVENTOR.
WILLIAM T. LIVERMORE
ATTORNEYS United States Patent Office 3,110,266
Patented Nov. 12, 1963

3,110,266
HYDRAULIC PUMP AND CONTROL VALVE
ASSEMBLY
William T. Livermore, 509 Middle River Drive,
Fort Lauderdale, Fla.
Original application Feb. 24, 1955, Ser. No. 490,288, now
Patent No. 2,977,888, dated Apr. 4, 1961. Divided
and this application May 23, 1960, Ser. No. 31,001
6 Claims. (Cl. 103—136)

This invention relates to a pump and valve assembly particularly adapted for use in a recirculating hydraulic pressure system involving intermittent, varying and high pressure requirements.

This is a divisional application based on Serial No. 490,288 filed February 24, 1955, now Patent 2,977,888 issued April 4, 1961.

One application for which the device is particularly suited is that of a power steering system wherein, in the absence of power demand, hydraulic fluid is normally circulated from a reservoir through a pump, at relatively low pressure through an open passage in the hydraulic steering gear, and through a return line to the reservoir; and wherein the passage through the steering gear is blocked by steering control action calling for hydraulic actuating power until the wheels have turned sufficiently to meet the steering control demand. Under the most severe requirements in such a system, for example, while turning the wheels of a stationary vehicle in heavy mud, maximum pressures in the order of 750 p.s.i. may be required, and substantial pressures may likewise be involved in ordinary parking maneuvers when wheel turning is not facilitated by vehicle movement. Very much lower pressures are involved in normal steering operations with the vehicle under way and during periods of straightaway driving very little, if any, power may be called for.

Under these circumstances, the most severe requirements on the pumping system are normally encountered when the vehicle is stationary with the engine running at idling or slightly over idling speed, while minimum power requirements are involved when the vehicle and engine are running at high speed. Since a pump for such system is normally driven through suitable fixed ratio gearing from the engine, such as by a direct coupling to an extended generator shaft which may rotate at a speed in the order of 1.8 times engine speed, the pump must have sufficient volume and pressure characteristics to meet the most severe requirements encountered with the engine running at or close to idling speed. Accordingly, in the case of any fixed displacement pump, a relatively large volume of oil will pass through the pump at the high engine speeds when the pressure requirements are relatively low. If the entire output of the pump were at all times continuously circulated through the hydraulic steering gear excessive flow would be involved and large passages required; and, if the pumping pressure head were constantly maintained at the maximum value, an excessive amount of work would be required accompanied by undue heating of the oil and high power losses.

Accordingly, it has been found desirable in such systems to provide means for by-passing a major portion of the pump output at high speed directly to the pump inlet without passing through the hydraulic steering gear thereby greatly reducing the flow through the steering system, and also to provide means for maintaining a relatively low normal pressure head increased only as required to meet power steering demands in order to minimize work loss and heating in the pumping system. Various forms of more or less complicated "flow control" valves have been developed in the past to effect such by-passing of the discharge of the pump whenever the output volume exceeds the immediate power requirements and whenever the pressure of the output exceeds a maximum safe value.

The present invention is directed primarily to simplifying and reducing the cost of the valve and pump construction for meeting these requirements. In this connection, the adaptation of a loose slipper pump of the general type disclosed in my United States Patent No. 2,599,927 to the requirements of hydraulic steering pumps has been undertaken with a view to substantially reducing costs of manufacture in this field. While the initial units designed and tested for this purpose gave early promise of meeting volume and pressure requirements encountered in actual vehicle operations, a number of rigorous "bench tests" imposed by vehicle manufacturers to uncover deficiencies under the most extreme operating conditions disclosed the necessity of many important and several critical modifications which were not apparent upon initial analysis, design and testing. For example, accelerated wear endurance tests such as 24 hour operation at 10,000 r.p.m. were found to produce wear points in the housing and slippers, slipper breakage, and slipper spring failure. On the other hand, high pressure tests devised to by-pass all of the discharge under maximum pressure directly back to the inlet at the pump for prolonged periods of time were found to increase the oil temperature to a point where expanding portions of the pump would cause binding. Various modifications devised to provide satisfactory operation under such rigorous test conditions have proved of great importance in achieving maximum capacity, durability and quiet operation under the wide range of operating conditions demanded for the commercially acceptable power steering pump of this type. More specifically, it is an object of the present invention to provide a single spring loaded valve which is adapted to perform all of the necesary pressure regulating and by-passing functions incident to the use of a fixed displacement rotary pump in a system of the type described.

Another object is to adapt such valve to circulate a relatively small volume of low pressure oil through the power circuit when there is no power demand, or when any power demand is satisfied, in order to keep the power circuit filled with oil at all times.

Another object is to adapt such valve to open to the by-pass position to inject directly into the intake of the pump any output exceeding the requirements for the above-mentioned circulation through the hydraulic circuit either under the condition of no power or power demand.

Another object is to adapt such valve to block automatically any by-pass flow to the inlet of the pump during any demand for power until such demand is satisfied.

Another object is to adapt such valve to perform such by-passing blocking action throughout progressively higher power demand requirements up to the maximum pressure of the system.

Another object is to adapt such valve to open to by-pass position whenever maximum pressure of the system is exceeded.

Another object is to combine such valve with a tangentially side ported rotary pump in a manner directing the by-pass fluid tangentially into the inlet port to effect a velocity injection filling of such port.

Another object is to develop a pressure head for producing such velocity injection filling of the inlet port adequate to overcome any centrifugal oil pressures tending to produce cavitation.

Another object is to employ a restricted orifice flow from the discharge port of the pump to the power circuit and to employ the pressure head built up against such orifice for moving said valve to a by-pass position.

Another object is to employ a spring to oppose such movement of the valve in order to establish a minimum flow through the power circuit.

Another object is to make such spring of sufficient strength to establish a pressure head exceeding atmospheric pressure by a sufficient value to assure adequate velocity injection filling to the inlet port to avoid cavitation.

Another object is to employ pressure resistance in the power circuit to supplement such spring in opposing movement of said valve to a by-pass position.

Another object is to employ a small differential area between effective area of such valve upon which said pressure in the power circuit acts and the area of the valve upon which the pump discharge pressure acts tending to open the valve to by-pass position such that the discharge pressure of the pump will overcome both the spring and the supplementing pressure in the power circuit after such power circuit pressure exceeds the maximum pressure for which the system is designed thereby causing such valve to operate as an automatic safety unloading valve.

Another object is to adapt such differential area to cooperate with the differential pressure across said orifice to cause said valve to by-pass any excess discharge of the pump even when the pressure requirements of the power system are at an intermediate or relatively high value short of maximum pressure.

Another object is to prevent any pumping action arising from movement of the valve due to changes in volume between the differential areas of the valve from interfering with smooth intake from reservoir to the inlet port of the pump.

Another object is to adapt a loose slipper type of rotary pump such as disclosed in my prior United States Patent No. 2,599,927 to the requirements of a high pressure, high speed power steering circuit.

Another object is to provide a slipper construction for such pump adapted to operate quietly at high speeds without cavitation.

Another object is to provide a slipper spring which will oppose slipper advancing in its notch.

Another object is to provide means for preventing slipper spring buckling.

Another object is to control slipper clearance in a manner such as to positively prevent excessive slipper shifting in its notch.

Another object is to provide a slipper construction of high strength and wearing properties which may be economically produced.

Another object is to provide means for conducting bearing leakage oil to the main supply sump in order to introduce cool oil into the pump even when full discharge is directly by-passed to the pump inlet.

Another object is to provide means for minimizing pump noise under all conditions of operation.

Another object is to provide means for assembling the pump which will automatically compensate for dimensional variations in the size and location of the respective parts.

These and other objects will be more apparently from the following detailed description of a preferred embodiment of my invention and from an examination of the drawings disclosing such embodiment wherein:

FIG. 6 is an enlarged fragmentary view of the pump rotor shown in FIG. 1 with the valve displaced to a by-pass position.

FIG. 7 is an enlarged view of one of the pump slippers taken along the line 7—7 of FIG. 6.

FIG. 8 is an enlarged sectional view of one end of a slipper taken along the line 8—8 of FIG. 7.

FIG. 9 is a modified valve construction similar to that shown in FIG. 1.

FIG. 10 is a further modified valve construction similar to that shown in FIG. 1.

Figure 1:
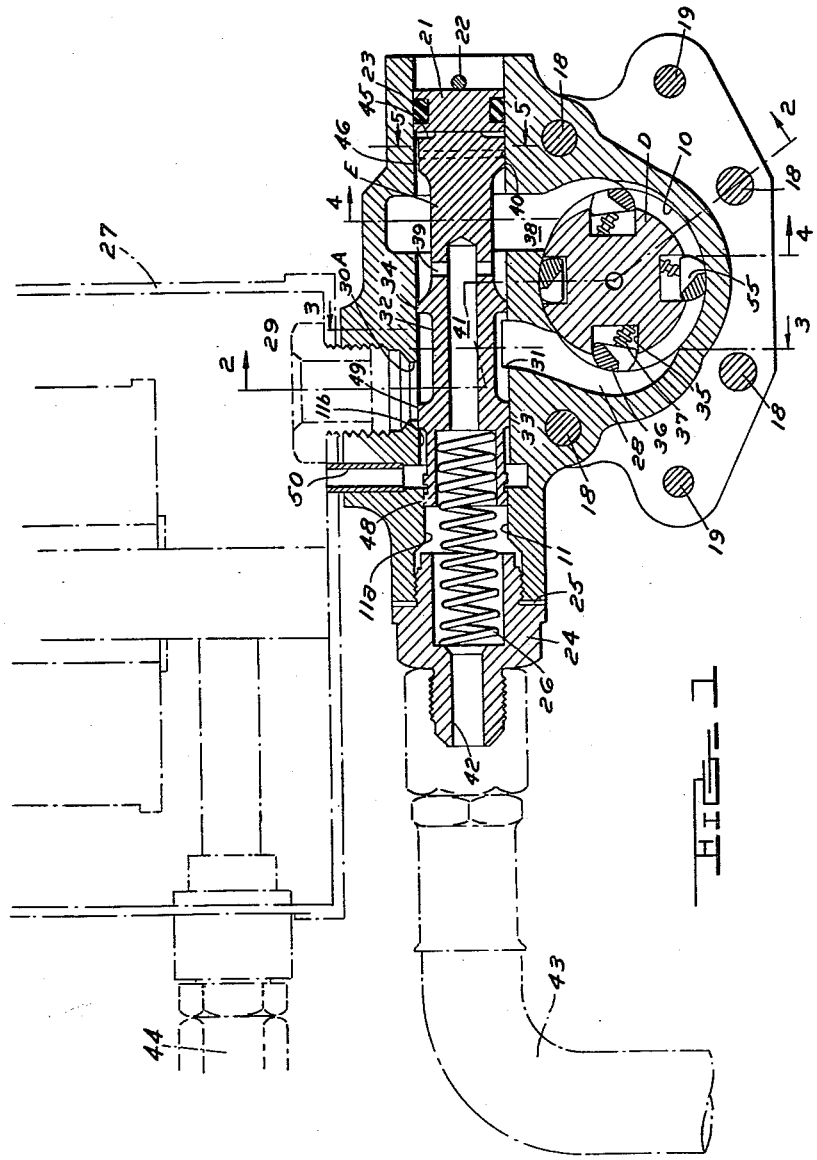
FIG. 1 is a sectional side elevation of the pump and valve assembly shown in relationship to an oil reservoir and connecting pressure outlet and return lines, such sectional view being taken transversely of the pump rotor and longitudinally of the valve bore.
Figure 2:
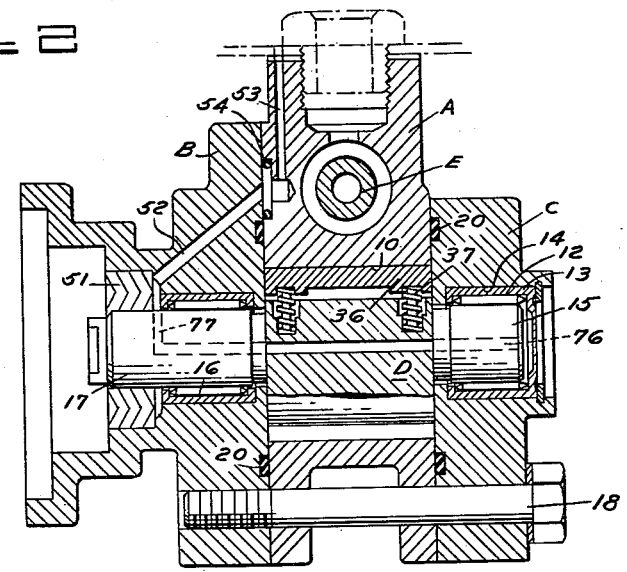
FIG. 2 is a sectional elevation taken along the line 2—2 of FIG. 1, showing a transverse section of the valve and longitudinal section of the pump rotor.

Referring to FIGS. 1 and 2 it will be seen that the pump and valve assembly comprise a main center housing A for valve and pump rotor, a front housing B for a rotor shaft bearing and drive coupling, a rear housing C for a second rotor shaft bearing, a pump rotor D, and a spool valve E. The main body A is provided with a transverse bore 10 in which the cylindrical pump rotor D operates and a longitudinal cylindrical bore 11 in which the spool valve E may move in an axial direction. Needle bearings 12 run in a closed end bearing race 13 pressed into a cylindrical bore 14 in the rear housing C and rotatably support a bearing shaft extension 15 of the pump rotor while similar needle bearings 16 rotatably support a rotor drive shaft extension 17 in the front housing B which may be coupled with a suitable source of power such as an extension of a generator shaft, not shown.

The center housing A is assembled to the front and rear housings B and C by four bolts 18 while a pair of dowel pins 19 accurately locate the respective housings in correct alignment. Flat machined surfaces of the respective housings register directly against each other in assembled position with circular O rings 20 seated in annular grooves in the respective rear and forward housings providing a seal against oil leakage between adjacent surfaces.

The travel of the valve E in the bore 11 is limited in one direction by a valve plug 21 which is held against outward displacement by a lock pin 22 and includes an O ring oil seal 23, while at the other end valve travel is limited by the inner end of an outlet fitting 24 screwed into an enlarged end of the bore 11 and into oil sealing engagement with a metal washer 25. A spring 26 is seated in the outlet fitting 24 and a recessed end of the valve E urging the valve toward engagement with the valve plug 21.

An oil reservoir 27 located above the valve and pump assembly communicates with a pump inlet port 28 centrally disposed at one side of the pump bore 10 through an inlet fitting 29 and passage 30 intersecting the valve bore 11 above an intersection 31 of the inlet port 28 with such valve bore. A necked portion 32 of the valve E between annular lands 33 and 34 provides constant communication between the oil reservoir 27 and inlet port 28 throughout the extremities of travel of the valve between the end plug 21 and the outlet fitting 24.

The pump rotor D is provided with a plurality of (preferably four) rectangular notches 35 which extend across the entire length of the rotor between the housings B and C. Within each of such notches a loosely mounted slipper 36 extends throughout the length of the rotor and is urged radially outwardly by a pair of compression springs 37 located near the ends of the slipper and seated in recesses formed in the rotor and slipper, respectively, as best shown in FIG. 2. The rotor length is equal to the width of the center housing less working clearance between the rear and front housing faces and the slippers are preferably constructed with a length providing slight additional working clearance relative thereto.

An outlet port 38 communicates centrally with the side of the rotor bore 10 opposite that of the inlet port 28 and with the valve bore 11 as best shown in FIG. 1. As the rotor turns in a counterclockwise direction as seen in FIG. 1, each slipper moves through an inlet arc of increasing radius, a working arc of constant radius, an outlet arc of decreasing radius, and a sealing arc of constant radius, thereby pumping a volume of oil between inlet and outlet ports proportional to the speed of rotation. From the outlet port 38, oil passes through a transverse orifice 39 in the necked portion of the valve E between annular lands 34 and 40, through a central passage 41 in the valve, an outlet passage 42 in the fitting 24, through a hose connection 43 to the power steering gear, not shown, and therefrom through return line 44 to the reservoir.

Oil pressure in the outlet port 38 also communicates with the right end 45 of the valve E through a flat 46 on one side of the land 40 and when the volume of flow through the orifice 39 is great enough to create a pressure differential between the right and left ends of the valve sufficient to overcome spring 26, the valve will shift to the left moving land 34 across the right margin of the inlet passage 31, by-passing fluid from the outlet port directly to the inlet port. As long as the flow through the steering gear is relatively unrestricted, as where no power is demanded, the valve E will provide a relatively low pressure by-pass. However, upon a steering demand arising which blocks the unrestricted flow through the steering gear, a drop in pressure differential across the orifice 39 will permit the pressure of spring 26 to return the valve to the position shown in FIG. 1 blocking the by-pass flow and thereby directing the full output of the pump to meet any power requirement within the pressure capacity of the system.

In order to provide a safety limit to the maximum pressure of the system, the left-hand land 48 of the valve E and bore 11a are constructed with a slightly smaller diameter than the remaining valve lands and bore 11b such that when the pressure reaches a predetermined maximum value, the outlet pressure on the larger right end of the valve will overcome the spring 26 even in the absence of flow through the power system and with no pressure drop across the orifice 39.

A land 49 is provided betwen the smaller diameter land 48 and the inlet passage 30, and an auxiliary vent 50 is provided between the reservoir 27 and the valve bore between the differential lands 48 and 49 in order to prevent any interruption or interference with smooth flow from the reservoir to the inlet port 28 as a result of displacement of fluid between the differential lands upon any rapid movement of the valve toward the left.

While the construction and general operation of the pump and valve assembly will be understood from the above description, there are a number of important factors in adapting the present construction to the high speed, high pressure requirements of an automotive power steering system which require a more detailed explanation. In the case of a direct drive from the generator shaft of an automotive vehicle, speeds in the order of 1.8 times crank shaft speed may be involved so that in order to provide an adequate safety factor the pump must be constructed to operate efficiently and quietly at speeds in the order of ten thousand r.p.m. On the other hand, maximum pressure demands at or near engine idling speed may be in the order of 750 p.s.i.

In order to minimize centrifugal effects on the oil and slipper elements arising from high speed operation, it has been found important to employ a rotor of small diameter proportioned to produce necessary volume requirements by employing a length of rotor at least equal to and preferably in excess of its diameter.

Even with the use of a small rotor, for example, in the order of 1¼ inches in diameter, the centrifugal effects on the oil in the slipper cavity during the filling cycle of slipper travel through the intake arc are such as to require special provisions to avoid cavitation and noisy operation resulting therefrom when the pump is running at high speeds. Since such centrifugal effects on the oil column between the base of the slipper notch and spring cavity and the intake port will exceed atmospheric pressure, feed from the reservoir alone cannot be relied upon even though the reservoir is placed above the pump as shown in FIG. 1. In practice it has been found essential to supplement such reservoir feed with velocity injection feed from the by-pass operation of the valve as shown in FIG. 6, such velocity injection feed being under a sufficient pressure head to at least compensate for any excess of centrifugal force over atmospheric pressure. Accordingly, in practice, it has been found desirable to load the valve E with a spring 26 of sufficient strength relative to the differential area of the valve and size of the orifice 39 to develop a minimum pressure head in the order of 40 p.s.i. in the outlet port before the valve opens to by-pass. By constructing the intersection 31 of the inlet port 28 with the valve bore 11 over a limited arc at the bottom of the bore, for example, with a total intersection arc of 90°, all of the oil by-passed by movement of the valve land 34 over the inlet port will be directed downwardly toward the bottom of the inlet port in a direction tangential to slipper travel, the velocity of such fluid assisting simultaneous flow from the reservoir and having no component in any way obstructing flow from the reservoir. Since the by-pass oil is delivered under a tangential velocity in the direction of slipper travel, it becomes correspondingly unnecessary for the slipper to accelerate the oil in the inlet port and as the velocity head of such fluid is transformed to pressure at the bottom of the inlet port, such pressure becomes adequate to overcome any centrifugal effects on the oil in the slipper cavity and to force complete filling of such cavity.

Figure 3:
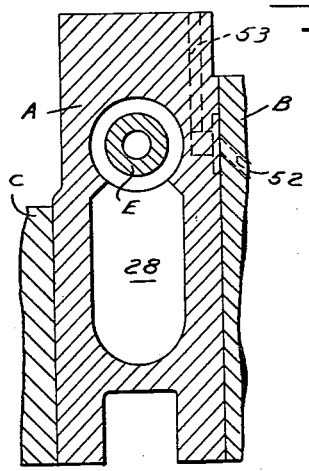
FIG. 3 is a sectional elevation taken along the line 3—3 of FIG. 1 showing the form of the inlet port.

In order to facilitate such complete filling and minimize the noise of pump operation, each slipper is constructed intermediate the end spring seats with a recess defined by beveled surface 55, as shown in FIG. 1, which extends across substantially the entire inlet port 28, best shown in FIG. 3, in order to provide a relatively unrestricted opening for oil flow from the inlet port to the notched chamber under the slipper and to form a scoop to assist in filling such chamber under the slipper.

Figures 4, 5:
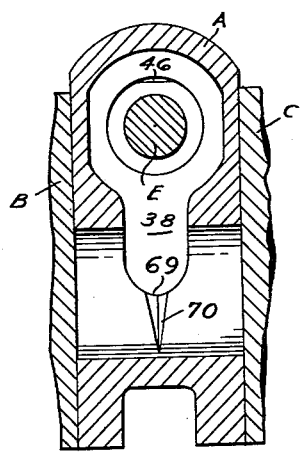
FIG. 4 is a sectional elevation taken along the line 4—4 of FIG. 1 showing the form of the outlet port.
FIG. 5 is a sectional elevation of the right end of the valve taken along the line 5—5 of FIG. 1.

High rotor speeds and resultant centrifugal forces on the slippers as well as high maximum pumping pressure requirements impose critical limitations on the contour of the bore 10 in which the rotor operates and the related slipper face 60 which engages such bore. With reference to FIG. 6, one form of bore which has proved satisfactory in operation employs a sealing arc 56 of .625 inch radius extending 22° on either side of the vertical center line, a working arc 57 of .750 inch radius extending 60° on either side of the vertical center line, arcs 61 of .801 inch radius tangential to the sealing arc 56, and arcs 62 of .562 inch radius tangential to the working arc 57, arcs 61 and 62 being tangential to each other. The rotor preferably has a radius equal to the sealing radius of the bore less working clearance. Satisfactory working engagement in a bore formed of the aforementioned arcs has been found to obtain by providing the face 60 of the slipper with a central radial arc 63 equal to the radius of the working arc 57 together with tangential radial arcs 64 equal to the minimum radial arc 62 of the bore, the corners 65 being broken with a ³⁄₆₄ inch radius. With such related slipper and bore dimensions it will be seen that the slipper face will provide a substantial area contact with the bore throughout the working arc where the slipper alone is depended upon for sealing area contact and will also provide substantial edge area contacts with that portion of the bore 62 having the most severe curvature and therefore highest acceleration loads on the slipper. The slipper will engage the sealing arc of the bore with line contacts at the points of tangency between the respective arcs on the slipper face during which period sealing requirements of the slipper are at a minimum due to the effective seal between the rotor and the bore, while the slipper face will engage the arc 61 with a single line contact where acceleration loads due to curvature are at a minimum. The cut-off edge 66 of the outlet port is located so as to be passed by the leading sealing edge of the slipper after the slipper has reached substantially its innermost position in the sealing arc so that no change in volume in the cavity under the slipper will take place after such passage. The cut-off edge 68 of the inlet port is likewise positioned for passage by the sealing surface 63 of the slipper after the slipper has reached its outermost position in the working arc. The working arc of the bore between the cut-off point 68 of the inlet port and the opening point 69 of the outlet port is sufficient to assure full registration of the sealing arc 63 of at least one slipper between such points at all times. However, in order to minimize noise believed to arise from air shock in opening to pressure incident to slight air inclusions in the oil, a progressive V groove 70, best shown in FIGS. 4 and 6, is provided which extends back to a point 71 just short of direct port-to-port connection between adjacent sealing slippers when at the position shown in phantom, thus providing a gradual buildup of pressure on the column of fluid between such adjacent slippers in the working arc when the leading slipper uncovers outlet pressure.

While frictional forces normally tend to hold the slippers back against the rear driving surface of the notch and centrifugal forces normally tend to urge the slippers outwardly into proper engagement with the bore in the rotor housing, certain forces may create a tendency for the slippers to shift forwardly in their notches, for example, at that portion of their travel through the inlet port where a component of the centrifugal force urges the slipper forward or at the end of the travel in the outlet port where a reduction in the radial position increases the angular speed of the slipper, or through the sealing arc where pressure leakage may induce forward shifting leading to objectionable noise in operation. In order to more positively urge the slippers backwardly into engagement with the rear driving surface of the notch, inclined compression springs 72 are employed between the rotor and either slipper end as best shown in FIG. 6, appropriate seats 73 and 74 being provided in the respective rotor and slippers to provide such inclination. In order to prevent such compression springs from buckling, stabilizing pins 75 having a length just short of minimum spring length are provided.

In order to further provide against the possibility of any noise effect from slipper shifting, the base of the slipper is formed with a clearance in the order of .009 inch relative to the width of the rotor notch while the radially outwardly extending forward and rear faces of the slippers are sufficiently relieved to permit the necessary rocking action of the slipper within the notch in following the contour of the pump bore, all as clearly shown by the various positions of the slippers in FIG. 6. Thus, even if at extremely high speed operation, acceleration forces overcome the effective springs 72 in holding the slippers back against the driving surface of the notch, any possible forward movement of the slipper in its notch will be so slight as to render any resulting noise effect inaudible.

Slippers formed of sintered powdered steel induction hardened running against a suitably hardened bore surface of a hardenable cast iron housing has been found to provide very satisfactory running properties under the most severe endurance tests to which the pump has been subjected.

In order to provide adequate cooling for the oil in endurance tests where full discharge of the pump is directly by-passed to the intake under maximum pressure for protracted periods of time, it has been found desirable to return bearing leakage oil to the sump by separate passage not directly associated with the pump intake from the oil reservoir, in order that bearing leakage oil may be replenished from the relatively cool oil in the reservoir. Referring to FIG. 2, it will be seen that suitable oil passages 76, 77 conduct oil from the needle bearings 12 in the rear housing C to a passage 52 in the front housing B which also communicates with the front needle bearing 16 and conducts oil therefrom to a passage 53 in the center housing A leading to the oil reservoir, an O ring seal 54 being provided at the inner face juncture of the vent passages 52 and 53. Such venting of oil leakage through the needle bearings also prevents pressure from building up on the packing 51 thereby preventing leakage to the exterior of the pump.

In a high pressure pump such as the present where the rotor is required to run with minimum sealing clearance relative to one side of the bore which requires very accurate positioning of the rotor in the bore, a serious manufacturing and assembly problem arises due to cumulative tolerances in the size and location of the journal bearings, rotor bore, journals, etc. In order to avoid impractical narrow ranges of tolerances, unduly expensive selective assembly procedures or similar relatively expensive conventional procedures for maintaining uniform and accurate positioning of the rotor in the housing bore, it has been found highly desirable in the present case to complete the drilling of one of the dowel holes 19 after preliminary assembly of the pump, and during temporary clamping of the respective housings. Thus with one of the dowels acting as a pivot for the respective housings A, B and C, and with the rotor journals assembled in their respective bearings and the faces of the respective housings in contact, the position of the end housings B and C may be shifted relative to the center housing A until a proper location is established between the rotor or a gauge plug simulating the rotor, and the bore in the central housing A whereupon the respective housings are suitably clamped while the other dowel hole is finish drilled thereby assuring desired take-up of clearance and automatic compensation for all tolerances in the respective size and location of the elements contributing to the relative positioning of rotor and bore surfaces.

Referring to FIG. 9, a modified valve construction is shown generally similar to that of FIG. 1 with respect to its function of by-passing fluid from the outlet port to the inlet port but having certain different control characteristics. Thus, instead of employing a differential area as in the case of the valve of FIG. 1, a valve bore 80 of uniform dimension throughout is employed along with a cylindrical valve 81 which includes a press fit bushing 82 having small plunger 82a urged by spring 83 acting on a headed pin 83a to block flow from chamber 85 into a cross passage 84 whenever delivery pressures in chamber 85 are below the maximum safety release pressure. A drilled passage 86 in the valve housing conducts fluid from the outlet port 38' through a restricted orifice 87 to the discharge passage 85 thereby developing a pressure differential acting on the respective ends of the valve 81 increasing with flow, as in the case of the valve of FIG. 1 where such pressure differential was built up across orifice 39 conducting output fluid through the center of the valve. The differential pressure across the orifice 87 accordingly will operate to move the valve 81 to the left against the resistance of the spring 26' when the pressure differential across such orifice reaches a predetermined value such as 40 p.s.i. thereby controlling the flow to the discharge chamber 85 and passage 42. When flow through the outlet passage 42' is completely blocked and pressure in chamber 85 builds up to a safety release pressure, plunger 82a is moved to the right against spring 83 permitting discharge of outlet pressure through cross passage 84 to the inlet port 28' and the resultant flow across orifice 87 again moves the valve to the left for direct discharge from outlet to inlet port. The plunger 82a, which may be a simple cylindrical needle bearing, is preferably constructed with one or more narrow flats 89 which conduct atmospheric pressure from the cross passage 84 to the spring chamber 90 permitting the pressure of spring 83 alone to control the ultimate safety release pressure at which the valve will unload. The flats 89 are preferably of small area providing restricted orifice "dashpot" effect for the oil in the chamber 90 in order to eliminate any "hunting" tendency for the plunger 82a.

It will be understood that since the plunger 82a remains closed at pressures below the maximum safety release pressure, the pump is capable of delivering fluid at high pressures to the outlet line 42' at the same rate of flow as at low pressures due to the absence of differential areas of the valve operating with increasing pressure to increasingly oppose the bias of spring 26' as in the case of the valve of FIG. 1. The practical effect of this is to permit an equally fast turning rate in the power steering mechanism when maximum resistance to wheel turning is encountered as well as in the case of very low resistance.

Referring to FIG. 10, a further modified valve is shown similar in all functional respects to that of FIG. 9 except that a ball check valve 91 is employed in place of the plunger 82a to control the safety release pressure.

While a particular embodiment of the complete pump and valve assembly and certain modified valve constructions, all of which have proved highly satisfactory in operation, have been described in detail, it is to be understood that numerous changes in detailed construction might be resorted to without departing from the scope of my invention as defined in the following claims.

I claim:

1. A pump comprising a pump housing, a rotor bore in said housing, inlet and outlet ports in said housing communicating with opposite sides of said bore, a rotor eccentrically mounted in said bore extending beyond said inlet and outlet ports on either side, axially extending notches in the periphery of said rotor, loosely mounted slippers in said notches with resilient means urging them to engage the surface of said rotor bore and to move radially during passage of said inlet and outlet ports, the central portion of the leading edge of said slippers immediately adjacent the port areas in said housing being recessed to provide wide-open radially extending flow paths to and from the notch chambers under said slippers, the unrelieved ends of said slippers extending circumferentially across substantially the full corresponding notch dimension, said unrelieved ends being provided with spring seats and a pair of compression springs to urge each slipper outwardly into engagement with the rotor bore, said compression springs being positioned at an angle inclined to a radial direction to urge said slippers backwardly relative to their peripheral travel.

2. A pump set forth in claim 1 wherein said compression springs have pins inserted to prevent spring buckling.

3. A pump comprising a pump housing, a rotor bore in said housing, inlet and outlet ports in said housing communicating with opposite sides of said bore, a cylindrical rotor eccentrically mounted in said bore, said bore having a sealing arc between said inlet and outlet ports having a curvature mating with said rotor surface, a working arc between said inlet and outlet ports concentric with said rotor surface, and transition arcs tangentially joining said respective sealing and working arcs including maximum curvature arc portion of said bore, a plurality of axially extending slipper notches in the periphery of said rotor, a slipper in each notch adapted to be driven by said rotor and continuously engage the surface of said bore, the engaging face of each slipper having a central portion of curvature providing area contact with said working arc, and edge surfaces of greater curvature providing area contact with the maximum curvature arc portions of said bore.

4. A pump comprising a pump housing, a rotor bore in said housing, inlet and outlet ports in said housing communicating with opposite sides of said bore, a cylindrical rotor eccentrically mounted in said bore, said bore having a sealing arc between said inlet and outlet ports having a curvature mating with said rotor surface, a working arc between said inlet and outlet ports substantially concentric with said rotor surface, and a pair of circular arcs adjacent each of said ports having radii respectively smaller than said sealing arc and greater than said working arc tangentially joining each other and respective ends of said working and sealing arcs the arc of each pair having the smaller radius being joined with the working arc, a plurality of axially extending slipper notches in the periphery of said rotor, a slipper in each notch adapted to be driven by said rotor having angular freedom of motion therein, continuously engaging the surface of said bore and angularly positioned by its contact therewith, the engaging face of each slipper having a portion of curvature providing area contact with said working arc.

5. A pump comprising a pump housing, a rotor bore in said housing, inlet and outlet ports in said housing communicating with opposite sides of said bore, a cylindrical rotor eccentrically mounted in said bore, said bore having a sealing arc between said inlet and outlet ports having a curvature substantially coincident with said rotor surface, a working arc between said inlet and outlet ports substantially concentric with said rotor surface, and a pair of circular arcs adjacent each of said ports having radii respectively of a minimum radius smaller than said sealing arc and maximum radius greater than said working arc tangentially joining each other and respective ends of said working and sealing arcs the arc of each pair having the minimum radius being joined with the working arc, a plurality of axially extending slipper notches in the periphery of said rotor, a slipper in each notch adapted to be driven by said rotor having angular freedom of motion therein continuously engaging the surface of said bore and angularly positioned by its contact therewith, the engaging face of each slipper having portions of curvature providing area contacts respectively with that of said working arc and the minimum radius arc portions of said bore.

6. A pump comprising a pump housing, a rotor bore in said housing, inlet and outlet ports communicating with said bore, a rotor eccentrically mounted in said bore, notches in the periphery of said rotor, loosely mounted slippers in said notches adapted to engage the surface of said rotor bore and to move radially in said notches, and spring means positioned to act along a line inclined to a radial direction adapted to urge said slippers backwardly relative to their peripheral travel against the driving side of said notches.

References Cited in the file of this patent

UNITED STATES PATENTS

| | | |
|---|---|---|
| 54,581 | Morris | May 8, 1866 |
| 1,651,336 | Wissler | Nov. 29, 1927 |
| 2,305,317 | Nickell | Dec. 15, 1942 |
| 2,312,514 | Zimmerer | Mar. 2, 1943 |
| 2,333,323 | Livermore | Nov. 2, 1943 |
| 2,353,965 | Meador | July 18, 1944 |
| 2,455,303 | Grate | Nov. 30, 1948 |
| 2,459,071 | Garrison | Jan. 11, 1949 |
| 2,499,763 | Livermore | Mar. 7, 1950 |
| 2,599,927 | Livermore | June 10, 1952 |
| 2,808,004 | Durante et al. | Oct. 1, 1957 |
| 2,977,888 | Livermore | Apr. 4, 1961 |

FOREIGN PATENTS

| | | |
|---|---|---|
| 37,227 | Denmark | Mar. 2, 1927 |
| 536,468 | France | Feb. 13, 1922 |
| 546,299 | France | Aug. 17, 1922 |
| 14,839 | Great Britain | July 13, 1908 |